US008240086B2

(12) United States Patent
Mangold et al.

(10) Patent No.: US 8,240,086 B2
(45) Date of Patent: Aug. 14, 2012

(54) WINDOW LIFT APPARATUS, DOOR MODULE, MOTOR VEHICLE DOOR AND METHOD FOR INSTALLATION OF A WINDOW LIFT APPARATUS

(75) Inventors: Claus Mangold, Helsa St. Ottilien (DE); Carsten Huege, Wehretal (DE); Frank Boecker, Hagen (DE); Marko Hermann, Eschwege (DE); Enrico Schliwa, Lauchroeden (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 953 days.

(21) Appl. No.: 12/093,609

(22) PCT Filed: Dec. 15, 2006

(86) PCT No.: PCT/EP2006/069784
§ 371 (c)(1), (2), (4) Date: Jul. 23, 2008

(87) PCT Pub. No.: WO2007/071629
PCT Pub. Date: Jun. 28, 2007

(65) Prior Publication Data

US 2008/0289256 A1 Nov. 27, 2008

(30) Foreign Application Priority Data

Dec. 19, 2005 (DE) ......................... 10 2005 061 009

(51) Int. Cl.
*B60J 1/16* (2006.01)
(52) U.S. Cl. ......................................................... 49/375
(58) Field of Classification Search .................... 49/374, 49/375, 502
See application file for complete search history.

(56) References Cited

U.S. PATENT DOCUMENTS

| | | | | | |
|---|---|---|---|---|---|
| 4,991,351 | A * | 2/1991 | Bertolini | ......................... | 49/351 |
| 5,692,273 | A * | 12/1997 | Rodde | ............................. | 24/541 |
| 6,205,711 | B1 * | 3/2001 | Klippert | .......................... | 49/375 |
| 6,330,764 | B1 * | 12/2001 | Klosterman | .................... | 49/375 |
| 6,460,296 | B1 | 10/2002 | Arquevaux | | |
| 6,557,302 | B1 * | 5/2003 | Kaps | ............................... | 49/375 |
| 7,055,284 | B2 * | 6/2006 | Napoli et al. | ................... | 49/349 |
| 7,409,797 | B2 * | 8/2008 | Pound et al. | ..................... | 49/375 |
| 7,721,487 | B2 * | 5/2010 | Costigan et al. | ................ | 49/375 |

(Continued)

FOREIGN PATENT DOCUMENTS

DE 102004017645 A1 11/2005

(Continued)

OTHER PUBLICATIONS

German International Preliminary Report on Patentability and Written Opinion for PCT/EP2006/069784.

(Continued)

*Primary Examiner* — Jerry Redman
(74) *Attorney, Agent, or Firm* — Timothy X. Gibson, Esq.; Gibson & Dernier LLP

(57) ABSTRACT

A window lift arrangement with a driver for a window pane, an inner door panel, positioning instruments for positioning the driver relative to the inner door panel in an installation position for installation of the window pane, wherein the positioning instruments can assume a first and a second position, wherein the positioning instruments in the first position define the installation position and wherein the positioning instruments in the second position enable a movement of the driver for opening and closing the installed window pane.

17 Claims, 12 Drawing Sheets

U.S. PATENT DOCUMENTS

| | | | | |
|---|---|---|---|---|
| 2002/0050100 | A1* | 5/2002 | Tatsumi et al. | 49/375 |
| 2006/0130407 | A1* | 6/2006 | Castellon | 49/375 |
| 2006/0185248 | A1 | 8/2006 | Kollner | |
| 2007/0006533 | A1* | 1/2007 | Dedrich et al. | 49/375 |
| 2007/0151161 | A1* | 7/2007 | Hernandez et al. | 49/375 |
| 2008/0098657 | A1* | 5/2008 | Campbell et al. | 49/375 |

FOREIGN PATENT DOCUMENTS

| | | | |
|---|---|---|---|
| DE | 10255461 | A1 | 6/2008 |
| FR | 2781006 | A1 | 1/2000 |
| FR | 2830894 | A1 | 4/2003 |
| JP | 63235123 | A * | 9/1988 |
| WO | 2005095745 | A1 | 10/2005 |

OTHER PUBLICATIONS

English translation of the International Preliminary Report on Patentability for PCT/EP2006/069784.

English translation of the Written Opinion for PCT/EP2006/069784.

German International Search Report and Written Opinion for PCT/EP2006/069784.

* cited by examiner

WINDOW LIFT APPARATUS, DOOR MODULE, MOTOR VEHICLE DOOR AND METHOD FOR INSTALLATION OF A WINDOW LIFT APPARATUS

BACKGROUND

The invention concerns a window lift arrangement, a door module with a window lift arrangement, a motor vehicle door with a window lift arrangement, and a procedure for installation of a window lift arrangement.

The starting point of this invention is the window lift arrangement known from DE 10 2004 017 645 A1, whose disclosure content is herewith fully incorporated into this application by means of reference. Instruments for positioning and fixing the driver to simplify the installation of a window pane are known from this. Included in the embodiment disclosed there are instruments for positioning and fixing the driver by means of two support brackets [prisms], which are molded in one piece on the wall section, e.g. the inner door panel, and are used as lower stops for the driver.

So-called trackless window lift arrangements, of the type mentioned in DE 10 2004 017 645 A1, which get by without a cam chain guide [guide rail] for the driver, are also disclosed in DE 102 55 461 A1 and DE 10 2005 037 324, the latter still unpublished at the time of application.

A device for connecting a window pane with the driver of a window lift by means of a snap connection is known from DE 195 05 624 C2.

An inner door panel, which is used as a support for various elements of a window lift, is known from DE 202 18 678 U1. The inner door panel has an opening for installing the window lift from the inside of the door.

SUMMARY OF THE INVENTION

The task which forms the basis of the invention is to create an improved window lift arrangement, an improved door module, an improved motor vehicle door with a window lift arrangement and a procedure for installation of a window lift arrangement, in order to simplify the installation in particular of a window pane with a large glass drop.

In accordance with the invention, a window lift arrangement with a driver for a window pane is created. The window lift arrangement has an inner door panel and positioning instrument for positioning the driver in an installation position for installation of the window pane.

The positioning instruments can assume a first and a second position. In the first position, the positioning instruments define the installation position and in the second position the positioning instruments release a movement of the driver for opening or closing the installed window pane.

The design of the positioning instruments according to the invention has the advantage that the positioning instruments do not simultaneously define the maximum opening of the window pane, as is the case in DE 10 2004 017 645 A1. Rather, the positioning instruments can in principle be arranged anywhere desired along the traverse path of the driver. This is of particular advantage for the installation of a window lift arrangement in which the window pane can be [counter]sunk completely or almost completely in the door. The degree of lowerability of the window pane in the motor vehicle door is also called the "glass drop", wherein a glass drop of 100% means that the window pane is completely lowerable.

In the case of a completely or almost completely lowerable window pane, the window pane does not protrude or almost does not protrude over the upper door trim in its completely opened position, which makes installation in the completely opened position rather difficult. The invention, on the other hand, enables the positioning instruments to be arranged so that the window pane protrudes over the upper door trim in the installation position, even if it pertains to a window lift with a large glass drop, particularly a glass drop of 100%. In the installation position, therefore, the section of the window pane protruding over the upper door trim can be easily grasped, which makes installation considerably easier.

In one embodiment of the invention, the positioning instruments are arranged in a middle area of the inner door panel.

In one embodiment of the invention, the positioning instruments are movably-mounted on the inner door panel and designed for detachable fixing of the driver in the first position. For example, the positioning instruments can be rotatable and/or movable, so that a selection can be made between the first and second position.

The positioning instruments can also be completely or partially detachable from the inner door panel after the window pane has been installed.

Instead of on the inner door panel, the positioning instruments can also be movably-mounted on the driver, i.e. perhaps in a rotatable, movable or at least partially detachable manner.

In one embodiment of the invention, the positioning instruments have an elastic element for resetting to the second position after installation of the window pane. Alternatively or additionally, clamping elements for fastening the positioning instruments in the second position can be on hand. In this way, the positioning instruments are held securely in their second position after installation, so that they cannot disrupt the movement of the driver during opening and closing the window pane.

In one embodiment of the invention, the positioning instruments are designed to absorb the force initiated for creating a snap-in connection between the driver and the window pane. If this is not the case, a drive element such as a hauling rope is attached to the driver before installation of the window pane, if the window lift is designed as a cable pull window lift. In this case the hauling rope can absorb the force with which the window pane is pressed into the driver for creating the snap-in connection.

In another aspect, the invention concerns a door module or a motor vehicle door with a window lift arrangement according to the invention. For example it pertains to a window lift arrangement without guide rails for the driver and a relatively large glass drop, of almost 100% for example.

In another aspect, the invention concerns a procedure for installation of a window lift arrangement. For installation, the driver is first positioned by bringing the positioning instruments into the first position. After the driver is connected to the window pane, by snapping in [locking into place] for example, the positioning instruments are brought into a second position, in which the movement of the driver for opening or closing the installed window pane is released.

BRIEF DESCRIPTION OF THE DRAWINGS

Embodiments of the invention with reference to the drawings are described in more detail below. The following are shown.

DETAILED DESCRIPTION OF THE INVENTION

In the following description of embodiments of the invention, elements that correspond to one another are identified with the same reference marks.

Figure 1:
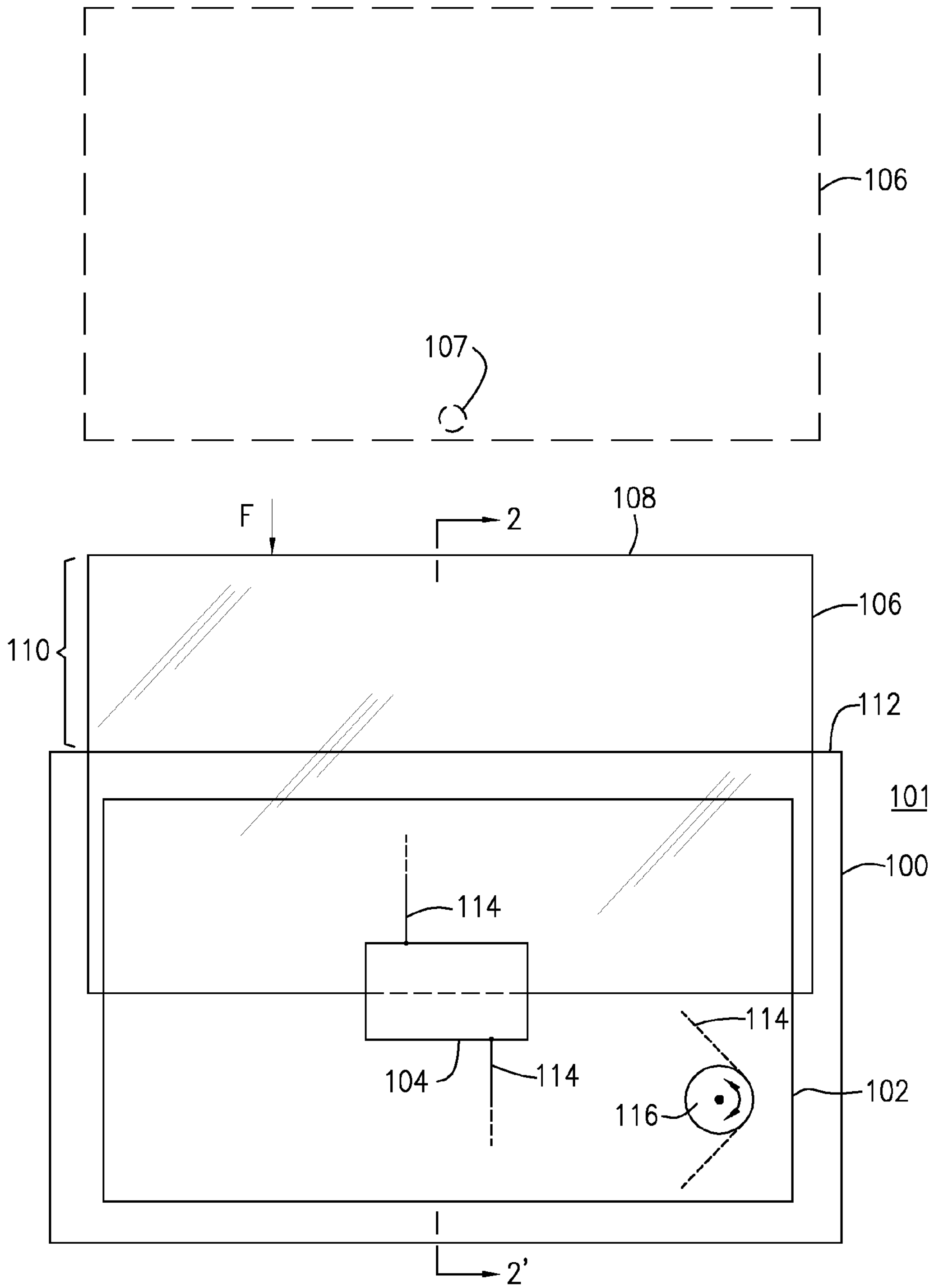
FIG. 1 A schematic depiction of an embodiment of a motor vehicle door module according to the invention, FIG. 2 A lateral sectional view of an embodiment of positioning instruments for a driver according to the invention taken along line 2-2' in FIG. 1, FIG. 3 A perspective view of an embodiment of positioning instruments according to the invention, swivel-mounted on an inner door panel, FIG. 4 A perspective view of the embodiment of FIG. 3, when the positioning instruments are in the first position, FIG. 5 An embodiment of positioning instruments according to the invention in the first position, FIG. 6 Another embodiment of positioning instruments according to the invention in the first position, FIG. 7 The embodiment of FIG. 6, wherein the positioning instruments are in the second position, FIG. 8 A sectional view of an embodiment of positioning instruments according to the invention taken along line 8-8' in FIG. 8A with a depiction of the first and second positions, FIG. 8A A schematic depiction of an embodiment of a motor vehicle door module according to the invention, FIG. 9 The embodiment of FIG. 8, with a sectional view of the inner door panel when the positioning instruments are in the second position, FIG. 10 Another embodiment of positioning instruments according to the invention taken along line 10-10' in FIG. 10A in a sectional view, FIG. 10A A schematic depiction of an embodiment of a motor vehicle door module according to the invention, FIG. 11 A perspective view of a jaw-shaped positioning element of the embodiment according to FIG. 10, and FIG. 12 A sectional view of an embodiment of positioning instruments according to the invention, wherein the positioning instruments are movably-mounted.

FIG. 1 shows a door module 101 with a motor vehicle door 100 with an inner door panel 102. Inner door panel 102 is used as a support, for example for various drive elements of a window lift arrangement. At the same time, the inner door panel can be used as a partition wall between a wet area and a dry area of motor vehicle door 100.

The window lift arrangement has a driver 104 for connecting to a window pane 106. Positioning instruments not shown in FIG. 1 are arranged on inner door panel 102 and/or driver 104. The positioning instruments have a first position for determining an installation position for connecting window pane 106 and driver 104, and a second position in which a movement of the driver is released for opening or closing the installed window pane along a traverse path of the driver.

FIG. 1 shows driver 104 in its installation position, which in the embodiment of the window lift arrangement being observed here is located approximately in the middle of inner door panel 102. After driver 104 has been positioned in the installation position, window pane 106 is brought from above out of its position indicated by dotted lines to its installation position shown in solid lines. In the installation position, window pane 106 is connected to driver 104, in that for example a force F is exerted on upper edge 108 of window pane 106, which causes driver 104 and window pane 106 to engage in a snap-in connection. For example, window pane 106 may have a hole 107 on its lower edge for creating the snap-in connection with driver 104.

Of particular advantage in the embodiment shown in FIG. 1 is the fact that area 110 of window pane 106 in its installation position protrudes over upper door trim 112 of motor vehicle door 100. This enables easy installation of window pane 106 and in particular the initiation of force F.

Before or after connecting window pane 106 and driver 104, driver 104 is connected to a drive element of the window lift arrangement. The drive element pertains, for example to a cable 114, which is guided via driving drum 116 of the window lift arrangement. Force F exerted for creating the snap-in or snap connection between driver 104 and window pane 106 is absorbed by the positioning instruments and/or cable 114.

The window lift arrangement of FIG. 1 may pertain to an embodiment with a relatively large glass drop, such as a glass drop of 100% or almost 100%. This means that after installation, window pane 106 can be moved completely or almost completely under upper door trim 112 by activating the window lift arrangement, so that even area 110 of window pane 106 disappears underneath upper door trim 112.

Figure 2:
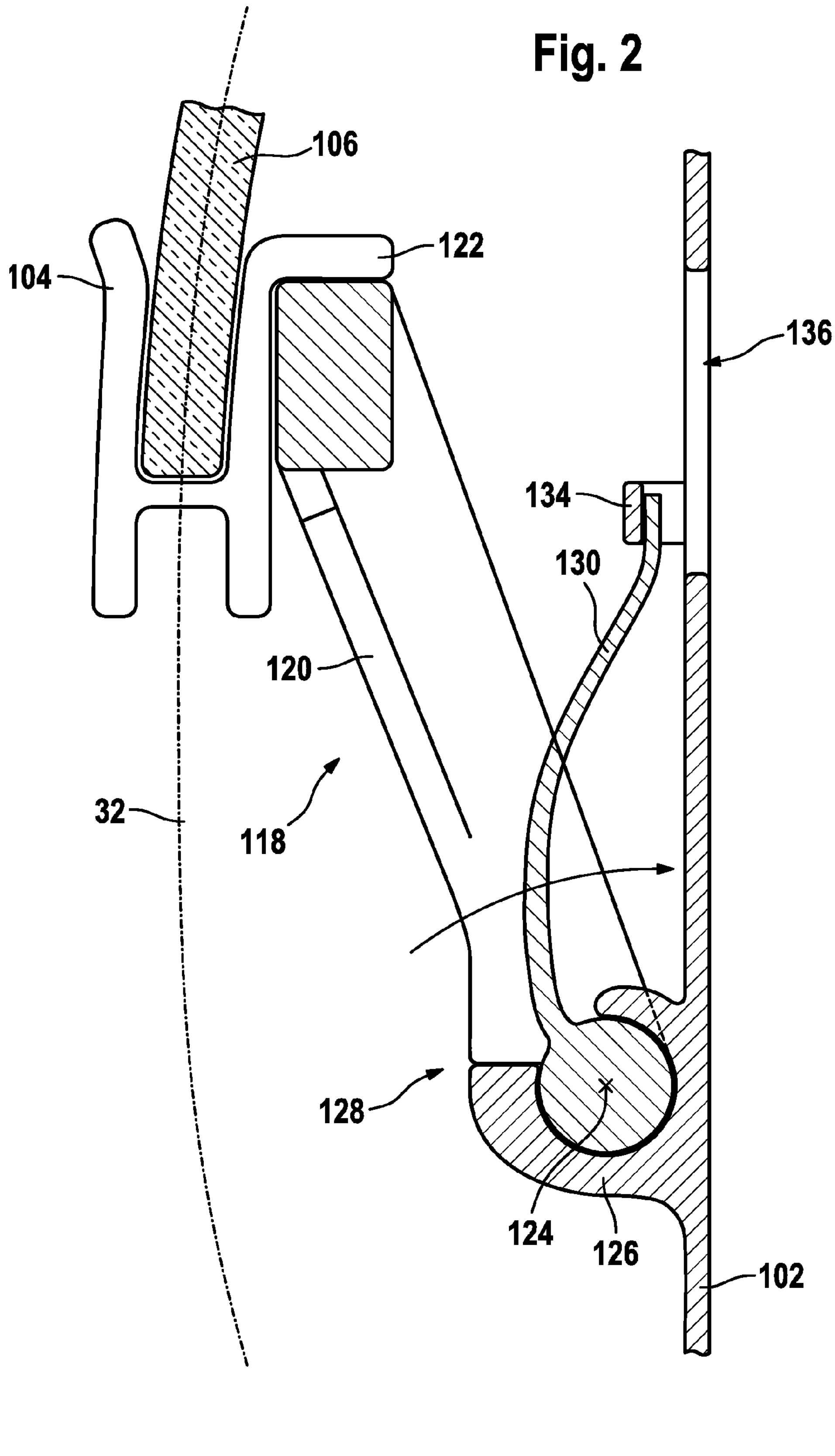

FIG. 2 shows an embodiment of positioning instruments 118. Positioning instruments 118 have an arm-shaped positioning element 120, which in its first position shown in FIG. 2 forms a stop at a stop area 122 of driver 104. This stop determines the installation position of driver 104.

Positioning element 120 is swivel-mounted on inner door panel 102 around an axis 124. A bearing 126 is designed on inner door panel 102 for this purpose. The swiveled position of positioning element 120 in its first position is determined by a stop 128 formed between positioning element 120 and bearing 126.

Positioning instruments 118 have an elastic element 130, such as an advance spring, which is used to bring positioning element 120 out of its first position shown in FIG. 2 into a second position, and keep it there; in the second position, a movement of driver 104 is released along its traverse path 132 for opening and closing installed window pane 106. Elastic element 130 is held by a snap-in hook 134. Installation hole 136 in inner door panel 102 is advantageous in particular for repair and maintenance work.

Figure 3:
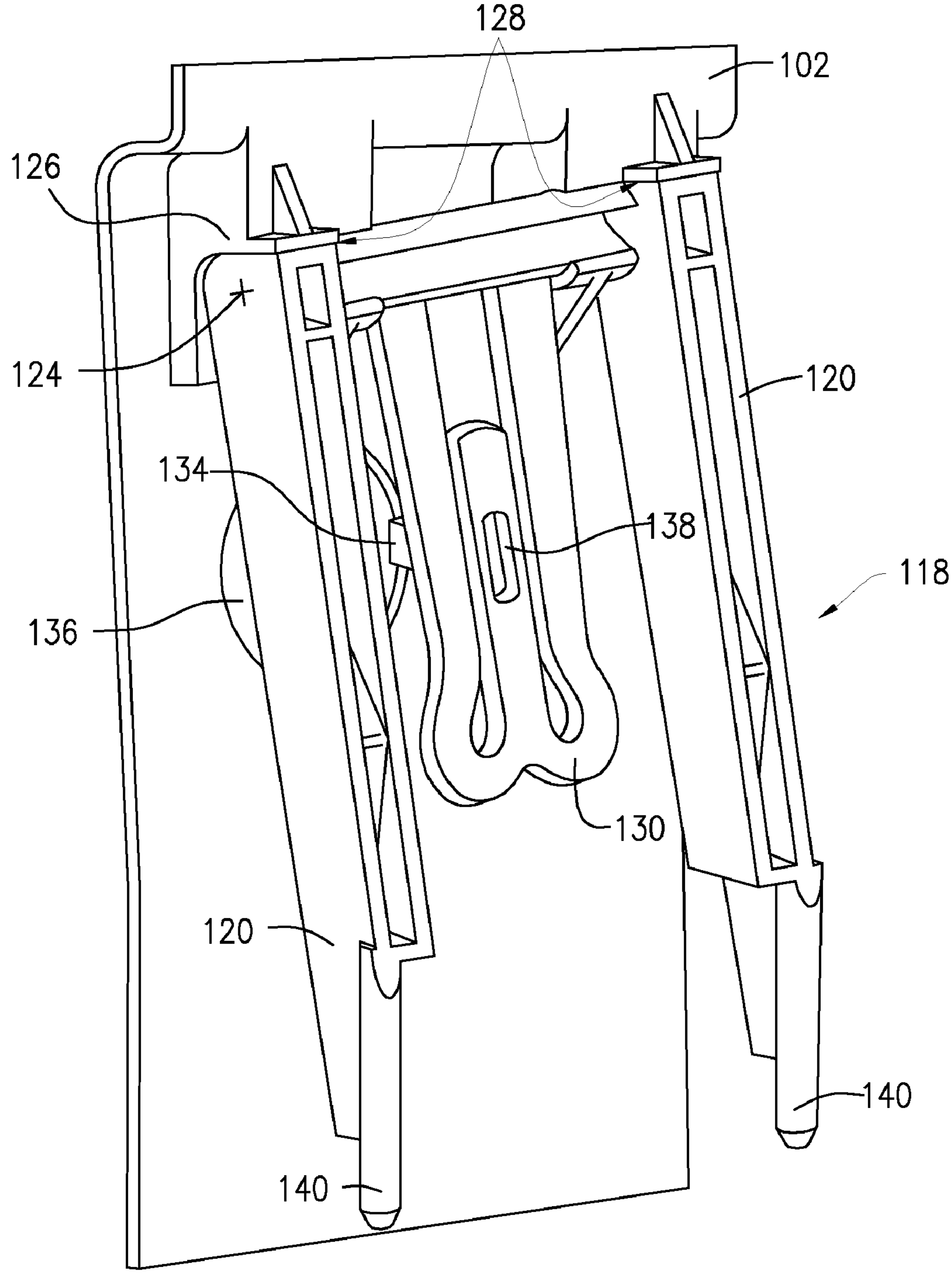

FIG. 3 shoes an embodiment of positioning instrument 118 in perspective view when positioning elements 120 are in the first position. FIG. 3 shows a middle area of inner door panel 102, on which positioning instruments 118 are arranged.

In the embodiment being observed here, elastic element 130 has a receiver slot 138 for a snap-in hook 134, which is arranged on inner door panel 102 in such a way that it is accessible through installation hole 136.

FIG. 3 shows positioning instruments 118 when snap-in hook 134 is not engaged in receiver slot 138. After snap-in hook 124 is engaged in receiver slot 138, elastic element 130 holds positioning instruments 118 in the second position. In this case, a restoring force is acting on positioning instruments 118.

In the first position of positioning instruments 118 shown in FIG. 3, stops 128 are formed between positioning instruments 118 and bearing 126, which defines the swiveled position in the first position. At its end which is remote from axis 124, positioning elements 120 each have a guide pin 140.

Figure 4:
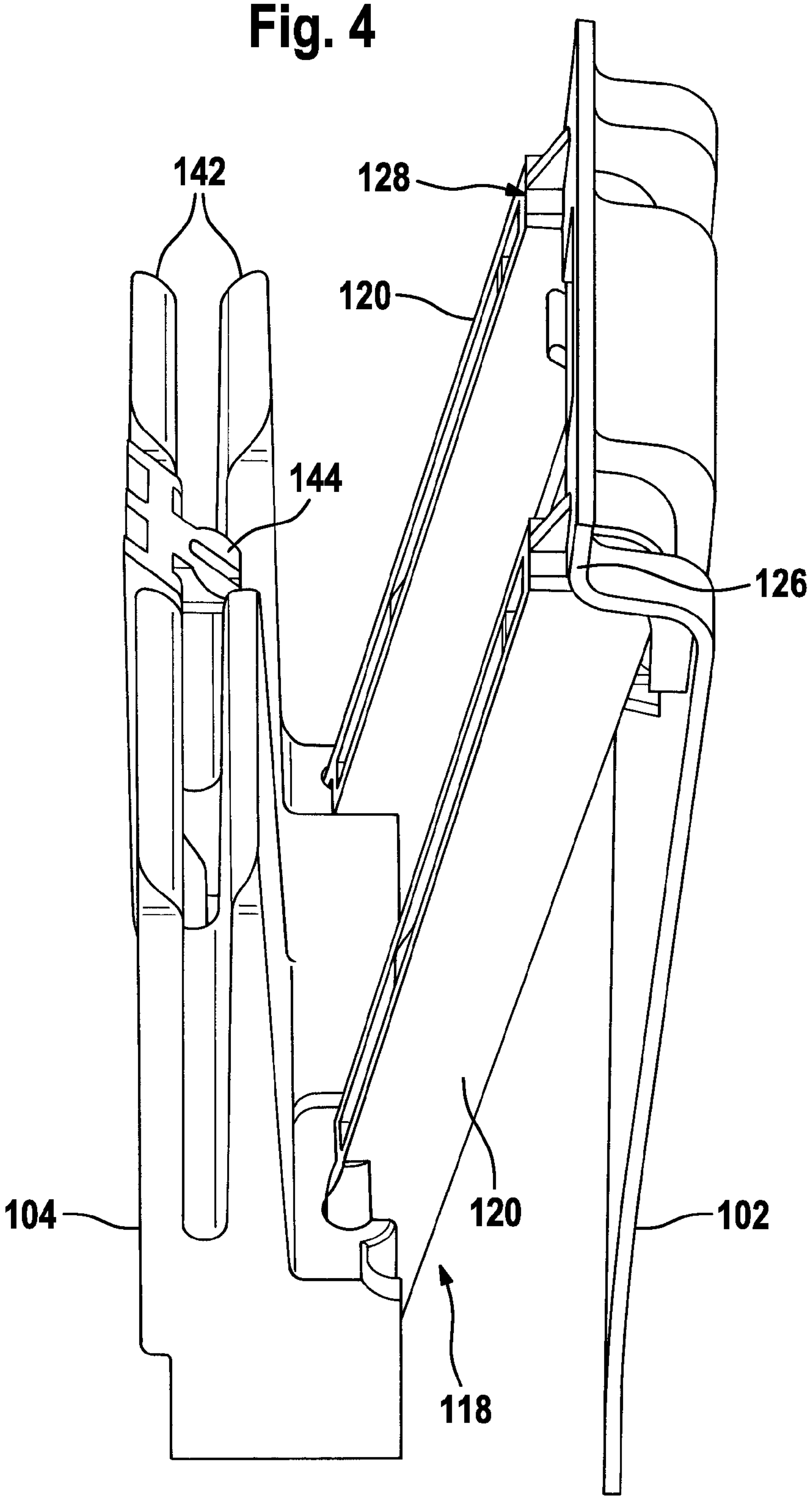

As depicted in FIG. 4, guide pins 140 are inserted in respective recesses of driver 104 so as to fix the driver in the installation position. Driver 104 in this embodiment has a pair of elastic expandable flanges 142 with a hook-shaped or peg-shaped snap-in element 144 for engaging in a respective hole 107 of window pane 106 (see also FIGS. 1 and 2).

Driver 104 is therefore fixed in its installation position by positioning instruments 118. In this position, the window pane is pushed from above between flanges 142, so that snap-in element 144 engages in hole 107 (see also FIG. 1).

For installation of window pane 106 (see also FIG. 1) snap-in hook 134 is first engaged in receiver slot 138, which brings positioning instruments 118 into the second position. Following this, positioning elements 120 are brought into first position, e.g. the installation position, which is shown in FIG. 4, perhaps manually against the restoring force of elastic element 130. In the first position, stop 128 is formed.

After installation of window pane 106 and cable 114 (see also FIG. 1), driver 104 is moved by activating the window lift arrangement, so that guide pins 140 are released; in the embodiment being observed here, driver 104 is moved downward to this end, e.g. in the opening direction of window pane 106. Due to the restoring force of elastic element 130 (see also FIGS. 2 and 3), positioning elements 120 rotate to their starting position, e.g. back to second position, so that traverse path 132 of driver 104 is completely released.

To replace the window pane, positioning elements 120 are manually brought from the second position into the first position through installation hole 136. For example, an automobile mechanic can push a screwdriver through installation hole 136 onto one of positioning elements 120, so that positioning elements 120 are brought into the first position against the restoring force of elastic element 130. Then, by activating the window lift arrangement, driver 104 is moved in such a way that it inserts itself into positioning elements 120, i.e. into guide pins 140, so that it is brought into the installation position shown in FIG. 4. In this position, the connection between driver 104 and window pane 106 can be disengaged through installation hole 136 using a suitable tool and the window pane can be replaced.

Instead of using a snap connection, window pane 106 and driver 104 can also be connected in a different way, e.g. by means of a screw connection, an adhesive bond, a clamp connection or the like.

Figure 5:
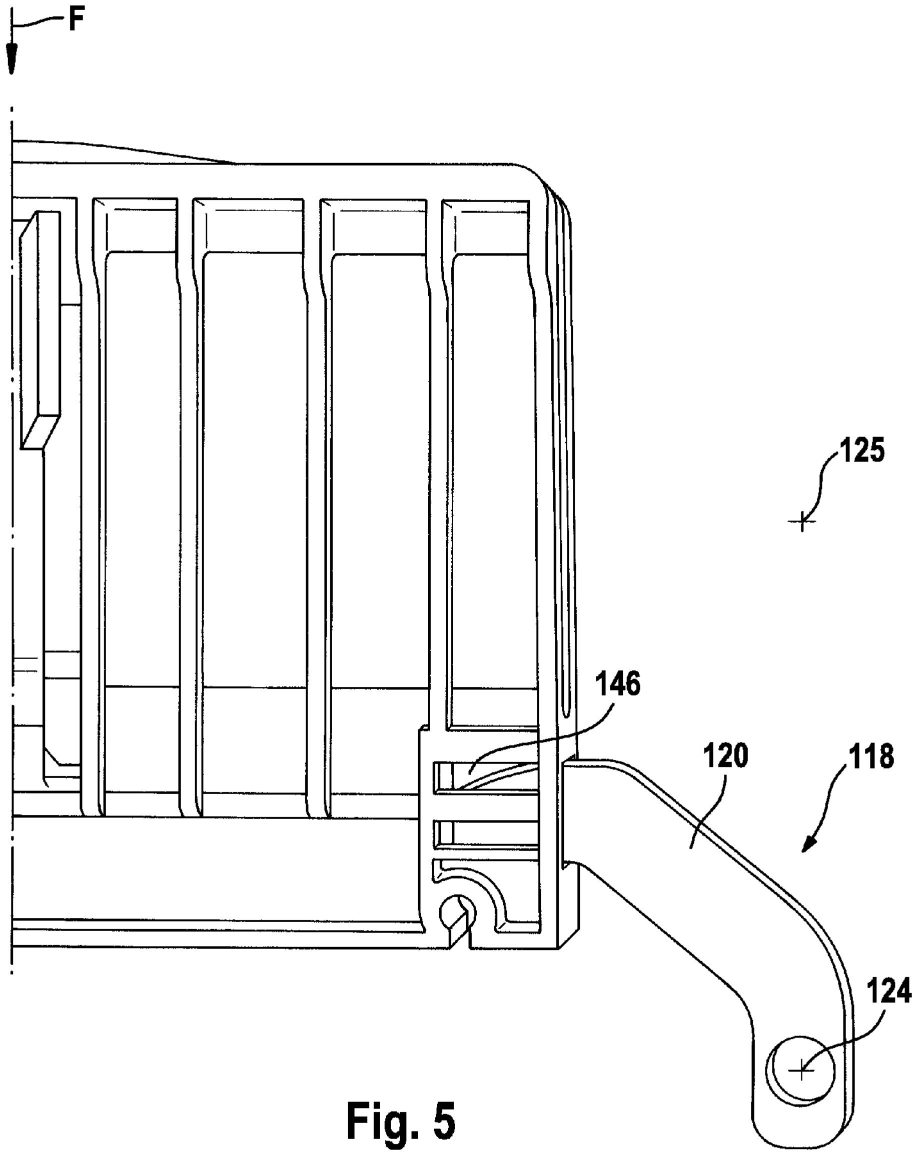

FIG. 5 shows one side of driver 104 and of positioning instruments 118. Positioning elements 120 are designed here as ratchets, which can encroach in respective recesses 146 of driver 104. FIG. 5 shows one of positioning elements 120 in the first position, e.g. the installation position of driver 104. Positioning element 120 is swivel-mounted around axis 124 on inner door panel 102 (see also FIGS. 1 to 4). At least one additional positioning element 120 is arranged on the other side of driver 104.

In the embodiment of FIG. 5, positioning elements 120 are designed in such a way that they can absorb force F when pressing window pane 106 between flanges 142 (see also FIG. 4). If driver 104 is moved upward after installation of the window pane, positioning element 120 slides out of recess 146 by rotating around axis 124 in a clockwise direction. After positioning element 120 has completely released driver 104, it rotates around its axis 124 in clockwise direction into its second position, outside of the traverse path of driver 104. A spring can be placed on axis 124 for this purpose, which exerts a restoring force on positioning element 120, in order to rotate in clockwise direction to its second position.

Alternatively, positioning element 120 can also be mounted on axis 125, which is located opposite axis 124, so that positioning element 120 can protrude into recess 146 from top to bottom. In this case, driver 104 is fixed in the installation position by positioning instrument 118, which features two of the symmetrically arranged positioning elements 120, without positioning instruments 118 being designed to absorb force F. Force F is in fact absorbed by cable 114 attached to driver 104 (see also FIG. 1).

Figure 6:
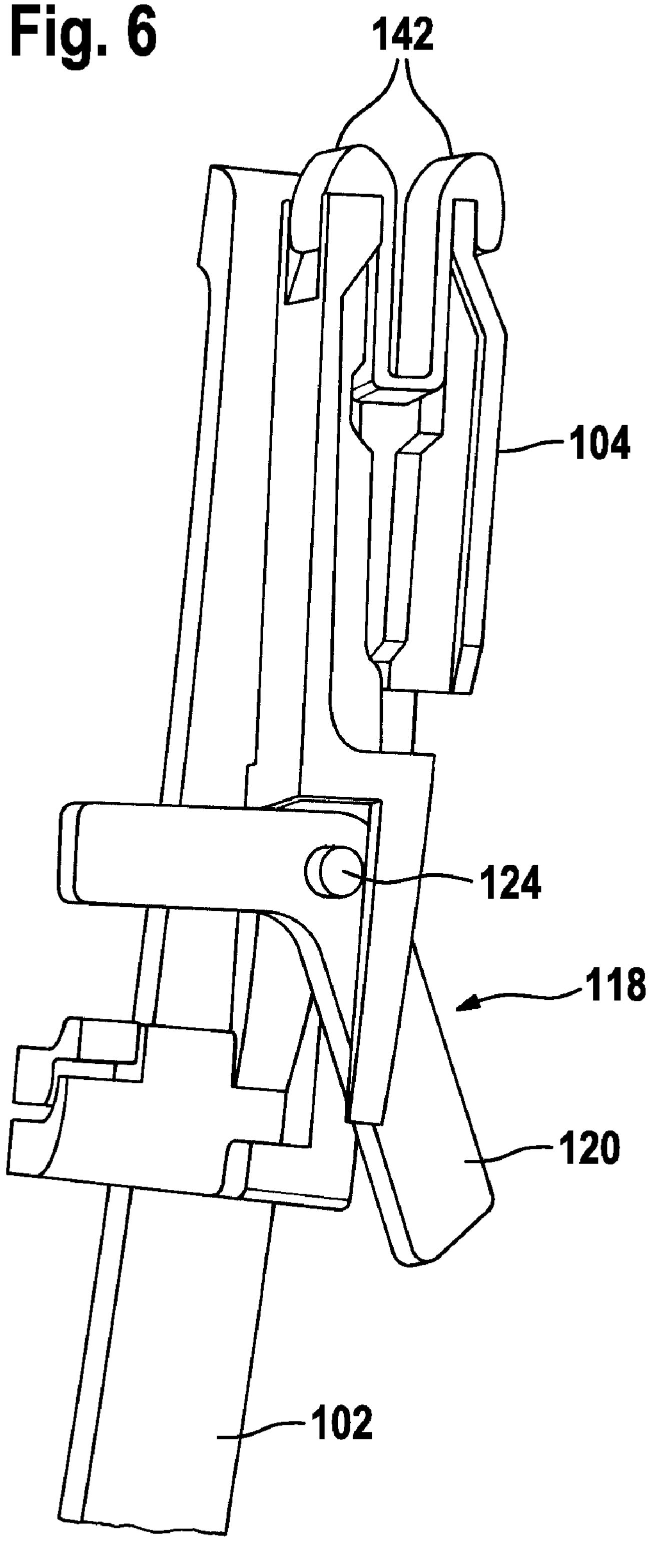

In the embodiment of FIG. 6, positioning element 120 is designed as angular and swivel-mounted around axis 124 formed on driver 104. FIG. 6 shows positioning element 120 in its first position, in which it determines the installation position of driver 104 relative to inner door panel 102.

Figure 7:
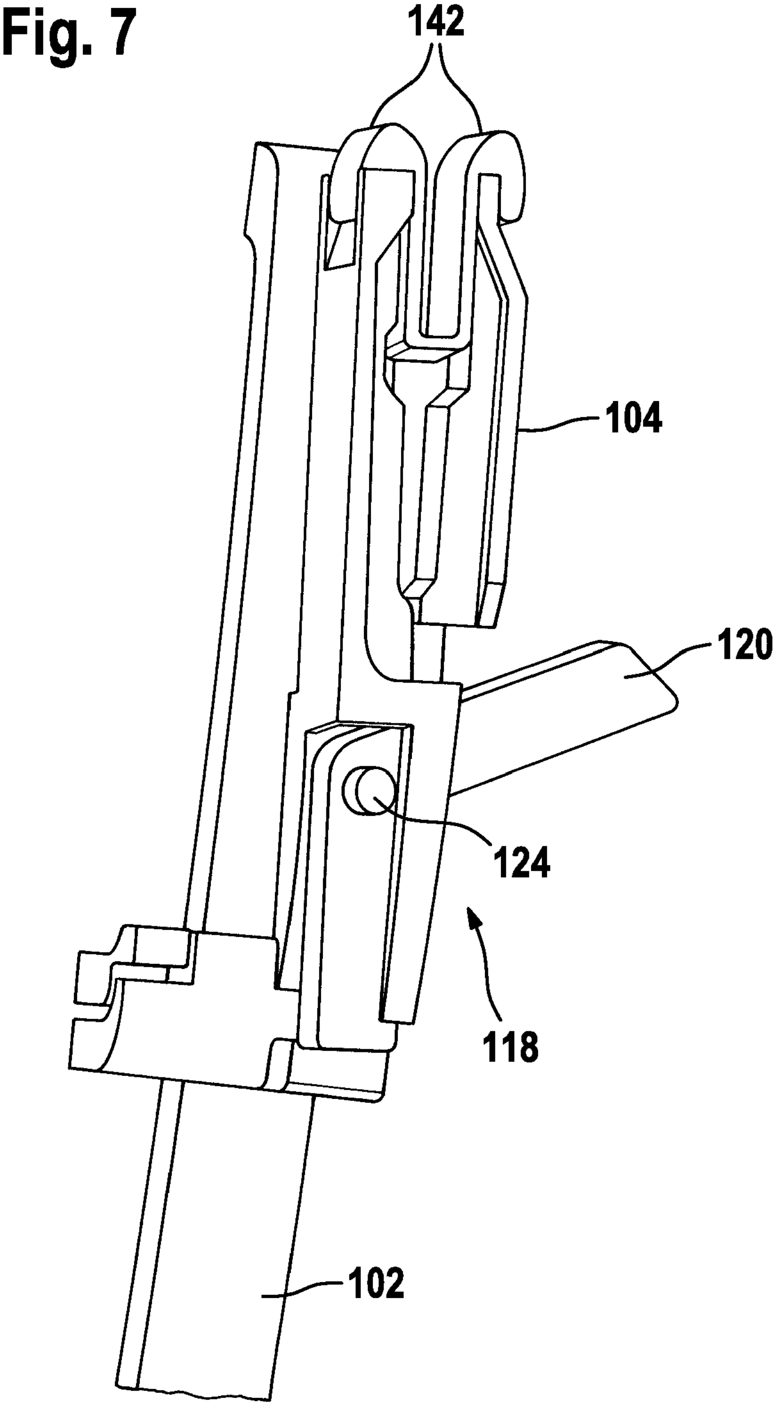

FIG. 7 shows positioning element 120 after it has been rotated into its second position, in which it releases the movement of driver 104. For example, positioning element 120 catches in this position, so that it cannot arrive at its first position unintentionally during operation of the window lift.

Figure 8:
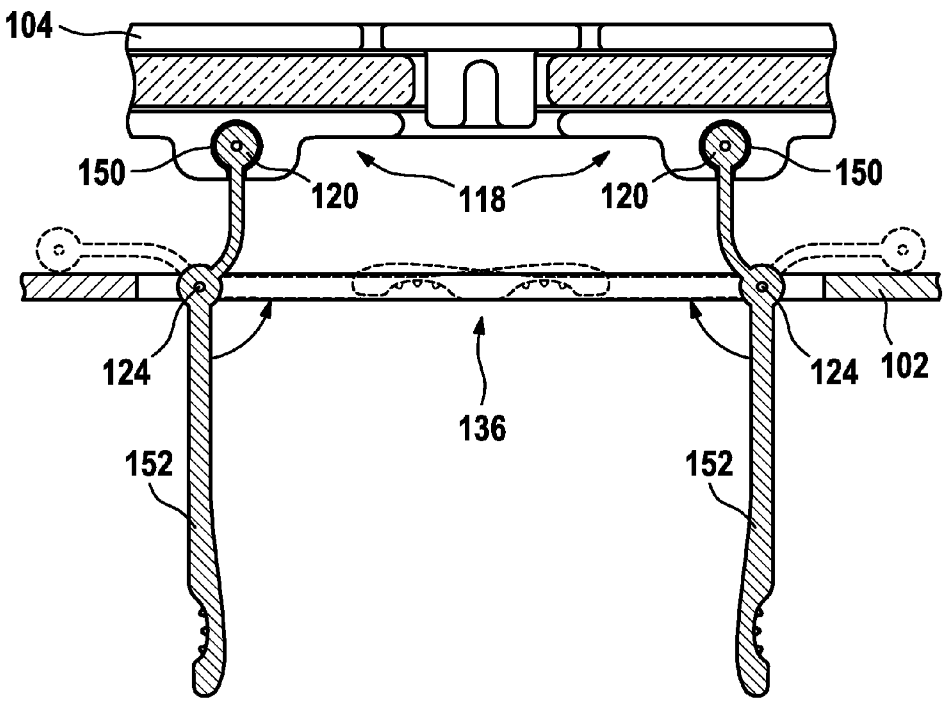

FIG. 8 shows another embodiment of driver 104 and positioning elements 120. In the embodiment being observed here, positioning elements 120 have contact elements (corresponding to guide pins 140 of the embodiment of FIGS. 3 and 4), which are used for insertion into recesses 150 of driver 104. The contact elements can be swiveled around axes 124 with locking lever 152 in the indicated sense of direction in order to rotate the contact elements from the indicated first position into the second position represented by dotted lines. The axes are formed here on inner door panel 102.

Figure 9:
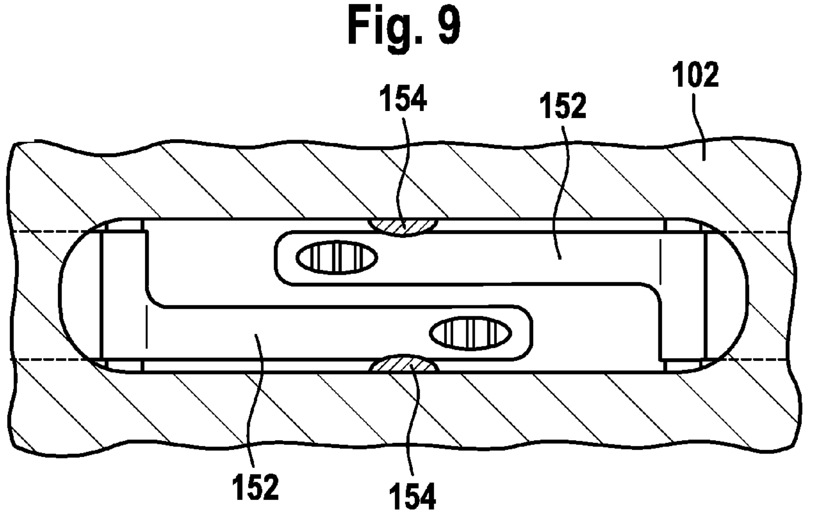
Figure 8A:
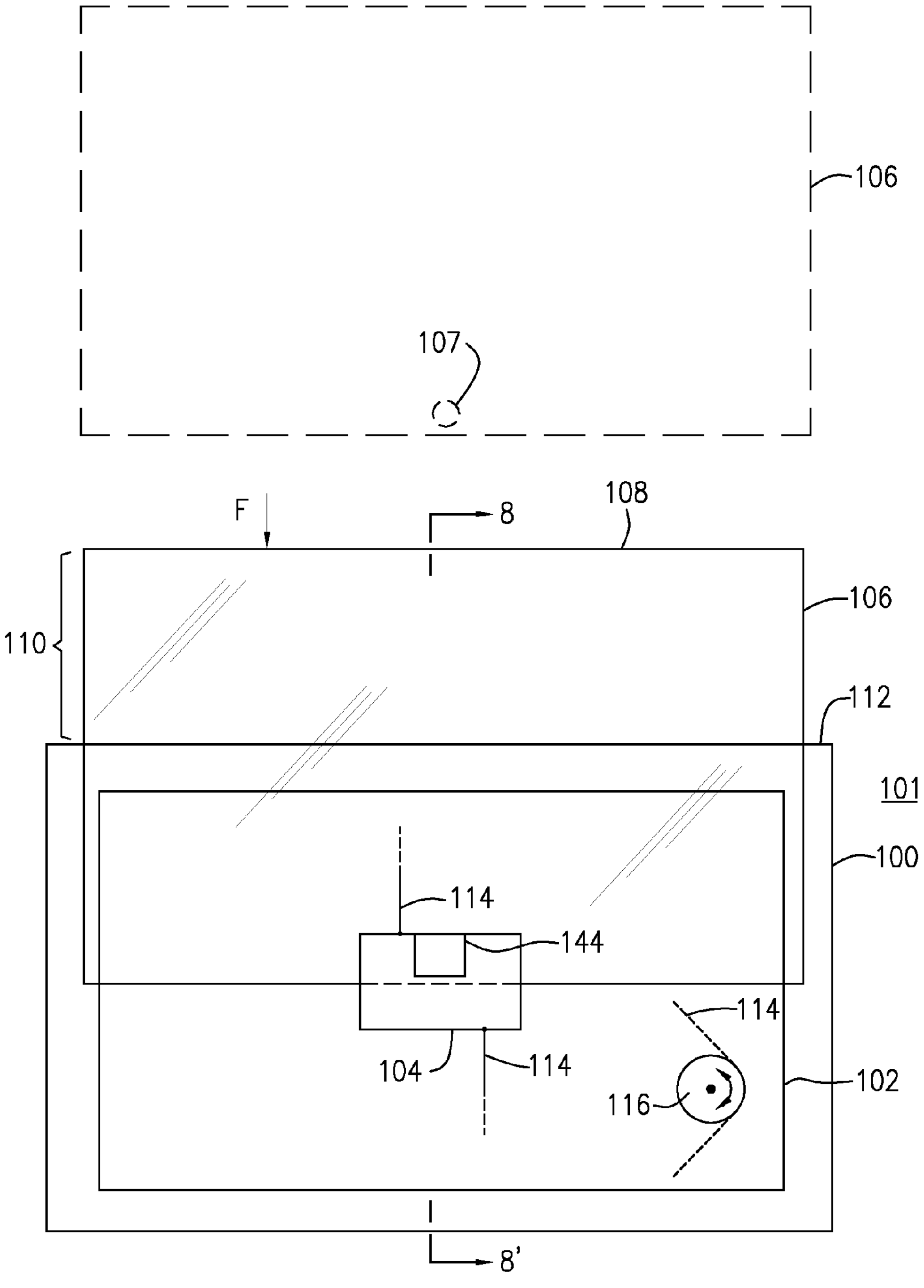

FIG. 9 shows a cross section of inner door panel 102 in the area of positioning instrument 118 of the embodiment of FIG. 8. FIG. 9 shows locking lever 152 after being swiveled into the second position. Locking levers 152 are arrested [stopped] there by clamping elements 154.

Figure 10:
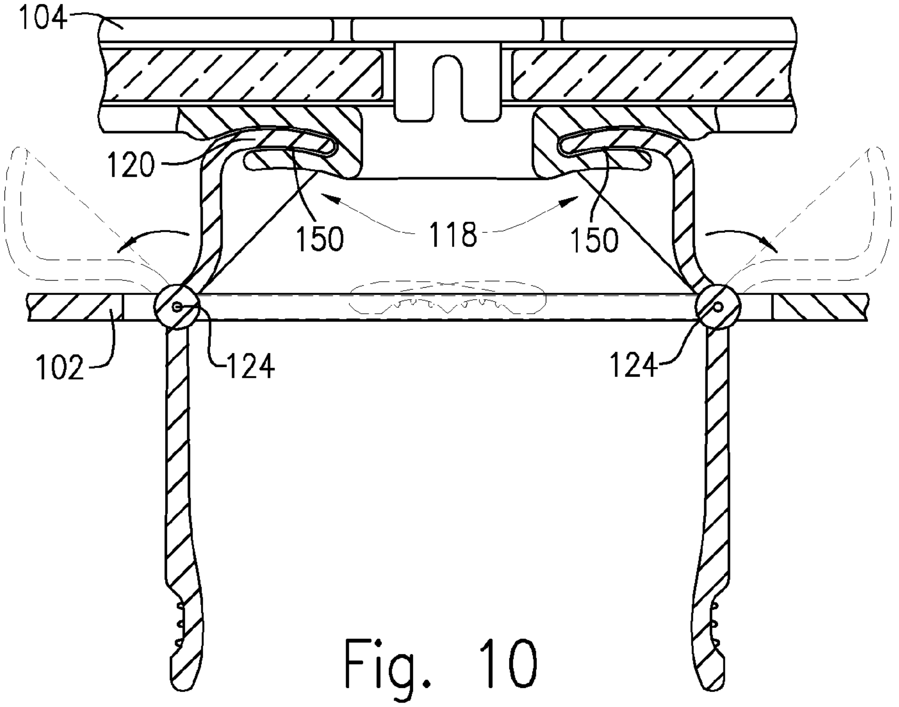

FIG. 10 shows another embodiment of positioning instruments 118 with a jaw-shaped positioning element 120 for making contact [intervention] in recess 150 of driver 104. FIG. 10 shows the positioning instruments in the first position; the second position of the positioning instruments is represented by dotted lines in FIG. 10.

Figure 11:
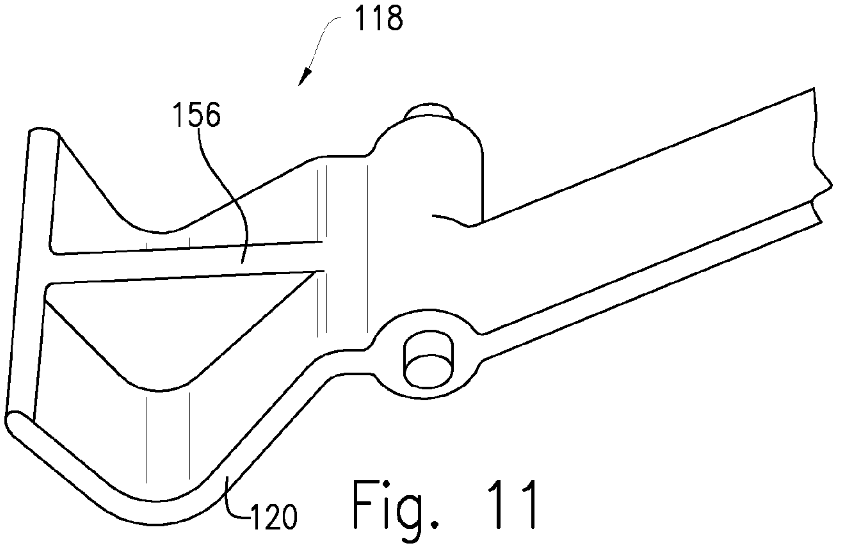
Figure 10A:
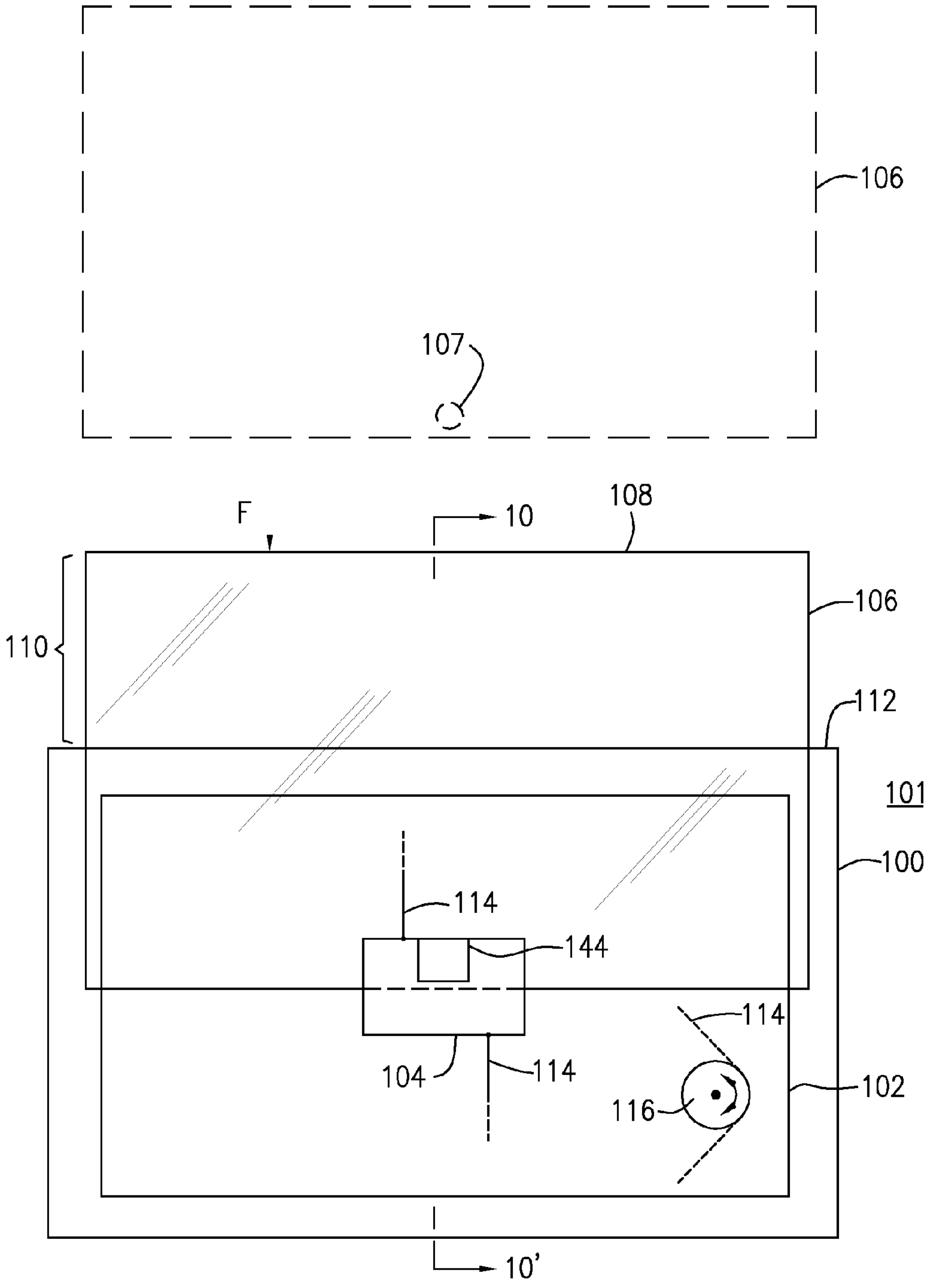

FIG. 11 shows a perspective view of positioning element 120 in the embodiment of FIG. 10. Positioning element 120 is jaw-like in form and may have a bar 156 approximately at its center, which is used to absorb force F (see also FIGS. 1 and 5), when positioning instruments 118 are in the first position.

Figure 12:
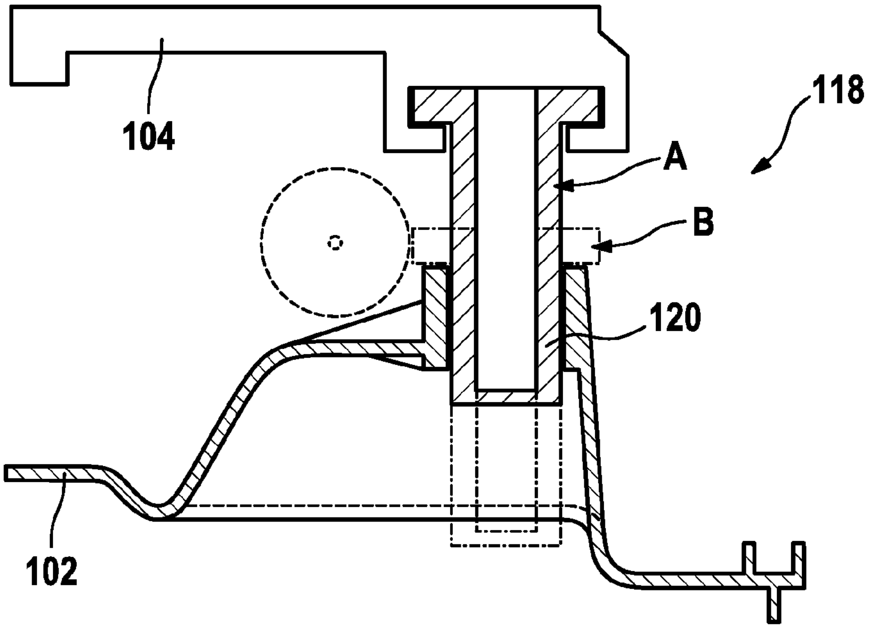

FIG. 12 shows an embodiment of positioning instruments 118 with a movably-mounted positioning element 120 almost perpendicular to inner door panel 102. By means of moving almost perpendicularly to inner door panel 102, positioning element 120 can be brought into first position A and second position B. In this embodiment, the positioning element is T-shaped at the top in order to be inserted into a respective recess 150 of driver 104.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE MARKS

100 Motor vehicle door
102 Inner door panel
104 Driver
106 Window pane
107 Hole (in window pane)
108 Edge
110 Area
112 Upper door trim
114 Cable
116 Driving drum
118 Positioning instruments
120 Positioning element
122 Stop area
124 Axis
125 Axis
126 Bearing
128 Stop
130 Elastic element
132 Traverse path

134 Snap-in hook
136 Installation hole
138 Receiver slot
140 Guide pin
142 Flanges
144 Snap element
146 Recess
150 Recess
152 Locking lever
154 Clamping element
156 Bar

The invention claimed is:

1. A window lift arrangement comprising a driver for engaging and moving a window pane, and positioning instruments for positioning the driver relative to an inner door panel in an installation position for installation of the window pane, wherein the positioning instruments can assume a first and a second position, wherein positioning instruments in the first position define the installation position and are engageable with the driver to block movement of the driver in an installation direction of the window pane, and wherein positioning instruments in the second position are disengaged from the driver to enable movement of the driver to open and close the window pane after installation, wherein the positioning instruments are pivotable between the first position and the second position.

2. The window lift arrangement of claim 1, wherein one or more of the positioning instruments are arranged in such a way that the window pane protrudes beyond an upper door trim in the installation position.

3. The window lift arrangement of claim 1, wherein the driver is designed for forming a snap-in connection with the window pane in the installation position.

4. The window lift arrangement of claim 3, wherein one or more of the positioning instruments are designed to absorb a force exerted for forming the snap-in connection.

5. The window lift arrangement of claim 1, wherein one or more of the positioning instruments are arranged in a middle area of the inner door panel.

6. The window lift arrangement of claim 1, wherein positioning instruments are movably-mounted on inner door panel and are designed for removable fixing of the driver in the first position.

7. The window lift arrangement of claim 1, wherein one or more of the positioning instruments are movably mounted on the driver and designed for removable fixing of the driver in the first position.

8. The window lift arrangement of claim 7, wherein one or more of the positioning instruments comprise a contact element for the removable fixing of the driver in the first position.

9. The window lift arrangement of claim 1, wherein one or more of the positioning instruments can be swiveled between the first and second position.

10. The window lift arrangement of claim 1, wherein one or more of the positioning instruments can be moved between the first and second position.

11. The window lift arrangement of claim 1, wherein the positioning instruments are completely or partially removable from the inner door panel or driver, in order to release the movement of the driver for opening or closing the installed window pane.

12. The window lift arrangement of claim 1, wherein one or more of the positioning instruments feature an elastic element for resetting to the second position after installation of the window pane.

13. The window lift arrangement of claim 1, wherein the window lift arrangement comprises one or more clamping elements for fixing one or more of the positioning instruments in the second position.

14. The window lift arrangement of claim 1, wherein the window lift arrangement comprises a glass drop of almost 100%.

15. A door module with a window lift arrangement according to claim 1.

16. A motor vehicle door with a window lift arrangement according to claim 1.

17. The window lift arrangement of claim 1, wherein the positioning instruments comprise an elastic element for resetting them into the second position after installation of the window pane.

* * * * *